(12) United States Patent
Yun

(10) Patent No.: US 7,382,517 B2
(45) Date of Patent: Jun. 3, 2008

(54) HYBRID LIGHT MODULATOR

(75) Inventor: Sang Kyeong Yun, Kyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 11/152,831

(22) Filed: Jun. 13, 2005

(65) Prior Publication Data

US 2006/0077517 A1    Apr. 13, 2006

Related U.S. Application Data

(63) Continuation-in-part of application No. 10/951,556, filed on Sep. 28, 2004.

(30) Foreign Application Priority Data

Jan. 5, 2005 (KR) ............... 10-2005-0000904
Apr. 26, 2005 (KR) ............... 10-2005-0034686

(51) Int. Cl.
*G02B 26/00* (2006.01)

(52) U.S. Cl. .................. 359/291; 359/292

(58) Field of Classification Search .......... 359/291, 359/292, 295, 298, 220, 222, 223, 224, 320, 359/322

See application file for complete search history.

(56) References Cited

U.S. PATENT DOCUMENTS

| | | | | |
|---|---|---|---|---|
| 6,654,157 B2 * | 11/2003 | Islam et al. | .......... | 359/291 |
| 6,747,785 B2 * | 6/2004 | Chen et al. | .......... | 359/291 |
| 6,829,092 B2 * | 12/2004 | Amm et al. | .......... | 359/573 |
| 7,215,461 B1 * | 5/2007 | Leung et al. | .......... | 359/291 |
| 2003/0035215 A1 | 2/2003 | Amm | | |

\* cited by examiner

*Primary Examiner*—Ricky Mack
*Assistant Examiner*—Tuyen Tra
(74) *Attorney, Agent, or Firm*—Christensen O'Connor Johnson Kindness PLLC

(57) ABSTRACT

The present invention provides a hybrid light modulator. The hybrid light modulator of the present invention includes an element having a protrusion to diffract incident light even at an early light receiving stage and to control the diffractive angle of the light using a microactuator, unlike conventional diffractive light modulators which reflect and diffract incident light using a plurality of micromirror actuators. Therefore, the present invention realizes device miniaturization and assures easy digital operation. Furthermore, piezoelectric force may be used to provide an actuating force to the element of the hybrid light modulator. Alternatively, electrostatic or electromagnetic force may be used as an actuating force for the hybrid light modulator.

12 Claims, 9 Drawing Sheets

HYBRID LIGHT MODULATOR

BACKGROUND OF THE INVENTION

1. Field of the Invention

The present invention relates generally to light modulators, and more particularly, to a hybrid light modulator which includes a plurality of ribbons each having a plurality of protrusions to diffract incident light from an early light receiving stage and to control a diffractive angle of the light beam using a microactuator, thereby realizing the miniaturization of a device and assuring the ease of digital operation, unlike conventional diffractive optical modulators in which incident light is reflected and diffracted by the operation of a plurality of micromirror actuators.

2. Description of the Related Art

Generally, an optical signal processing technology has advantages in that a great amount of data is quickly processed in a parallel manner unlike a conventional digital information processing technology in which it is impossible to process a great amount of data in real time, and studies have been conducted on the design and production of a binary phase only filter, an optical logic gate, a light amplifier, an image processing technique, an optical device, and a light modulator using a spatial light modulation theory.

The spatial light modulator is applied to optical memory, optical display device, printer, optical interconnection, and hologram fields, and studies have been conducted to develop a display device employing it.

The spatial light modulator is embodied by a reflective deformable grating light modulator 10 as shown in FIG. 1. The light modulator 10 is disclosed in U.S. Pat. No. 5,311,360 by Bloom et al. The light modulator 10 includes a plurality of reflective deformable ribbons 18, which have reflective surface parts, are suspended on an upper part of a silicon substrate 16, and are spaced apart from each other at regular intervals. An insulating layer 11 is deposited on the silicon substrate 16. Subsequently, a sacrificial silicon dioxide film 12 and a low-stress silicon nitride film 14 are deposited.

The nitride film 14 is patterned by the ribbons 18, and a portion of the silicon dioxide film 12 is etched, thereby maintaining the ribbons 18 on the oxide spacer layer 12 by a nitride frame 20.

In order to modulate light having a single wavelength of $\lambda_o$, the modulator is designed so that thicknesses of the ribbon 18 and oxide spacer 12 are each $\lambda_o/4$.

Limited by a vertical distance (d) between a reflective surface 22 of each ribbon 18 and a reflective surface of the substrate 16, a grating amplitude of the modulator 10 is controlled by applying a voltage between the ribbon 18 (the reflective surface 22 of the ribbon 18 acting as a first electrode) and the substrate 16 (a conductive layer 24 formed on a lower side of the substrate 16 to act as a second electrode).

In an undeformed state of the light modulator with no voltage application, the grating amplitude is $\lambda_o/2$ while a total round-trip path difference between light beams reflected from the ribbon and substrate is $\lambda_o$. Thus, a phase of reflected light is reinforced.

Accordingly, in the undeformed state, the modulator 10 acts as a plane mirror when it reflects incident light. In FIG. 2, the reference numeral 20 denotes the incident light reflected by the modulator 10 in the undeformed state.

When a proper voltage is applied between the ribbon 18 and substrate 16, the electrostatic force enables the ribbon 18 to move downward toward the surface of the substrate 16. At this time, the grating amplitude is changed to $\lambda_o/4$. The total round-trip path difference is a half of a wavelength, and light reflected from the deformed ribbon 18 and light reflected from the substrate 16 are subjected to destructive interference.

The modulator diffracts incident light 26 using the interference. In FIG. 3, the reference numerals 28 and 30 denote light beams diffracted in +/− diffractive modes ($D_{+1}$, $D_{-1}$) in the deformed state, respectively.

However, the Bloom light modulator adopts an electrostatic method to control a position of the micromirror, which has disadvantages in that an operating voltage is relatively high (usually, 20 V or so) and a correlation between the applied voltage and displacement is not linear, resulting in poor reliability in the course of controlling light.

Conventional light modulators disclosed in the patent filed by Bloom et al. have been used to form structures which display images. In such light modulator, two neighboring elements form one pixel. Of course, three neighboring elements may form one pixel. Alternatively, four neighboring elements may form one pixel. As a further alternative, six neighboring elements may form one pixel. In the case that a display device has an optical system which detects only diffracted light, when no voltage is applied to elements, such as ribbons, the ribbons are maintained in those original positions. At this time, pixels are dark, that is, are in a state of being turned off. Otherwise, when voltage is applied to the ribbons, the ribbons are warped downwards toward the silicon substrate. At this time, the pixels are bright, that is, attain a state of being turned on. A contrast ratio between a dark pixel and a bright pixel is a significant factor in forming the display system. In addition, an important matter in forming the display system is to accommodate the recent trend of miniaturization and high integration of electronic products.

However, the conventional light modulators disclosed in the patent filed by Bloom et al. have reached the limit in miniaturization. In other words, the conventional light modulators cannot be reduced under 3 µm in the width of the element. Furthermore, an interval between neighboring elements cannot be reduced under 0.5 µm.

SUMMARY OF THE INVENTION

Accordingly, the present invention has been made keeping in mind the above problems occurring in the prior art, and an object of the present invention is to provide a hybrid light modulator which includes ribbons having uneven upper surfaces, so that incident light is diffracted by the uneven upper surfaces of the ribbons from an early light receiving stage, but not by controlling the height difference between moving ribbons, thus realizing miniaturization and high integration of the hybrid light modulator.

In an aspect, the present invention provides a hybrid light modulator, including: a substrate; a light modulating unit mounted on the substrate, the light modulating unit including an intermediate portion spaced apart from the substrate; at least one protrusion extending in a direction away from the substrate, at least one depression adjacent to each protrusion; and wherein the protrusion and the depression each having a reflective surface to reflect incident light, so that diffractive light is formed by light reflected by the protrusion and by light reflected by the depression; and an actuating unit to move the intermediate portion of the light modulating unit spaced apart from the substrate towards and away from the substrate, so that the angle of the diffracted light varies.

In another aspect, the present invention provides a hybrid light modulator, including: a substrate; a support structure supported on the substrate so that portions of the support structure are spaced from the substrate by a predetermined distance, the support structure being movable towards or away from the substrate; a piezoelectric mirror layer disposed on the support structure such that the piezoelectric mirror layer is spaced from the substrate, said piezoelectric mirror layer comprising a piezoelectric material layer, whereby a predetermined portion of the piezoelectric mirror layer moves toward and away from the substrate when voltage is applied to opposite sides of the piezoelectric material layer, thus reflecting incident light; and at least one mirror layer disposed on the support structure at a distance from the substrate that is different from the distance that the piezoelectric mirror layer is located from the substrate, thus reflecting incident light.

In a further aspect, the present invention provides a hybrid light modulator, including: a substrate; a lower support structure supported by the substrate and configured so that portions of the support structure are spaced from the substrate by a predetermined distance; a first piezoelectric layer placed at a first location on the support structure, the first piezoelectric layer comprising a first piezoelectric material layer that generates an actuating force toward or away from the substrate by shrinking and expanding when a voltage is applied to the first thin-film piezoelectric material layer, thus reflecting incident light; a second piezoelectric layer placed at a second location on the support structure, the second piezoelectric layer comprising a second piezoelectric material layer that generates an actuating force toward or away from the substrate by shrinking and expanding when a voltage is applied to the second thin-film piezoelectric material layer, thus reflecting incident light; and a mirror layer disposed on the lower support structure at a location between the first and second piezoelectric layers and positioned at a different distance from the substrate relative to the location of the first and second piezoelectric layers, thus reflecting incident light.

In yet another aspect, the present invention provides a hybrid light modulator, including: a substrate; a support structure supported by the substrate and configured so that portions of the support structures are spaced from the substrate by a predetermined distance, the support structure being movable toward or away from the substrate; a piezoelectric mirror layer mounted on the support structure such that the entire piezoelectric mirror layer is on the portion of the support structure that is spaced apart from the substrate, and comprising a thin-film piezoelectric material layer, so that a predetermined portion of the piezoelectric mirror layer spaced apart from the substrate moves towards or away from the substrate when voltage is applied to the piezoelectric material layer, thus reflecting incident light; at least one, mirror layer disposed on the support structure and positioned so that the mirror layer is spaced apart from the piezoelectric mirror layer relative to the support structure, thus reflecting incident light.

In still another aspect, the present invention provides a hybrid light modulator, including: a substrate; a support structure supported by the substrate and configured so that portions of the support structure are spaced from the substrate by a predetermined distance; a first piezoelectric layer disposed on the support structure such that a portion of the first piezoelectric layer is disposed on the portion of the support structure not spaced from the substrate; a second piezoelectric layer disposed on the support structure such that a portion of the second piezoelectric layer is disposed on the portion of the support structure not spaced from the substrate; and at least one mirror layer disposed on the support structure at locations between the first and second piezoelectric layers and said at least one mirror layer located at a relative distance from the locations of the-piezoelectric layers, thus reflecting incident light.

In still another aspect, the present invention provides a hybrid light modulator, including: a substrate; a plurality of light modulating units arranged relative to each other, each of the light modulating units attached to the substrate and spaced apart at an intermediate portion thereof from the substrate, and comprising at least one first light reflecting surface at a first position relative to the substrate and at least one second light reflecting surface at a second position relative to the substrate and relative to the first light reflecting surface, thereby to diffract incident light, the light modulating units being movable toward or away from the substrate at the intermediate portion thereof that is spaced apart from the substrate, thus varying the angle of the diffracted light; and a plurality of actuating units to move the intermediate portions of the plurality of light modulating units toward or away from the substrate, so that an angle of the diffracted light varies.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
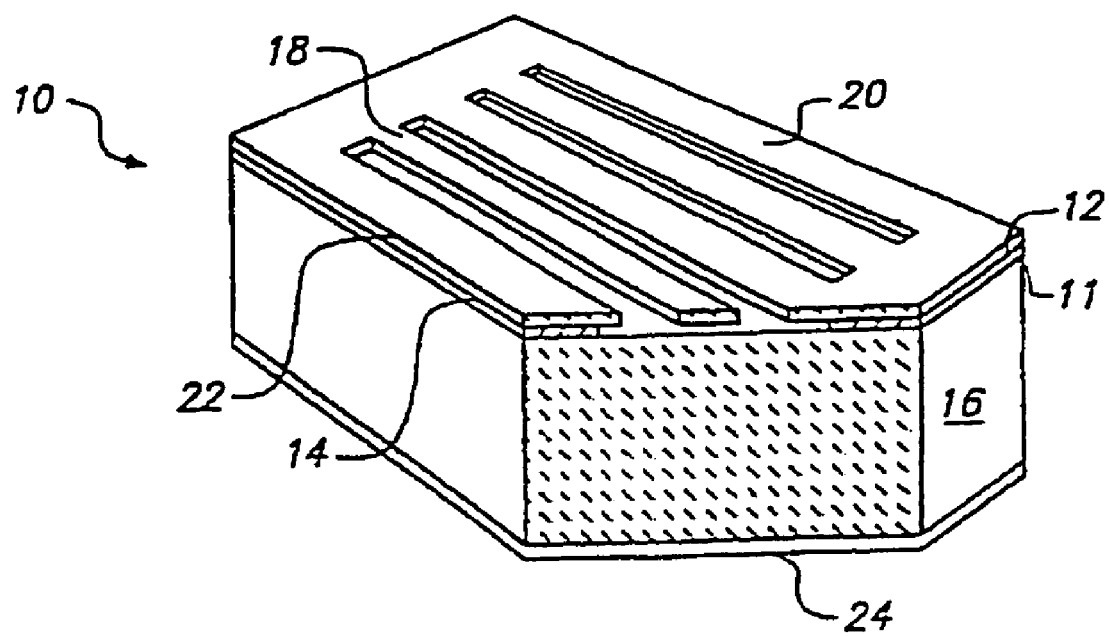
FIG. 1 illustrates an electrostatic-type grating light modulator according to a conventional technology.
Figure 2:
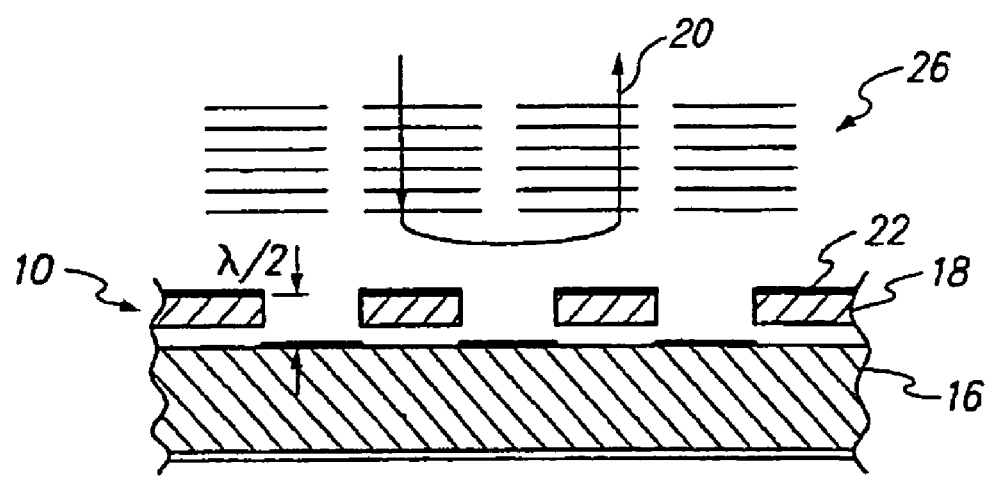
FIG. 2 illustrates reflection of incident light by the electrostatic-type grating light modulator according to a conventional technology in an undeformed state.
Figure 3:
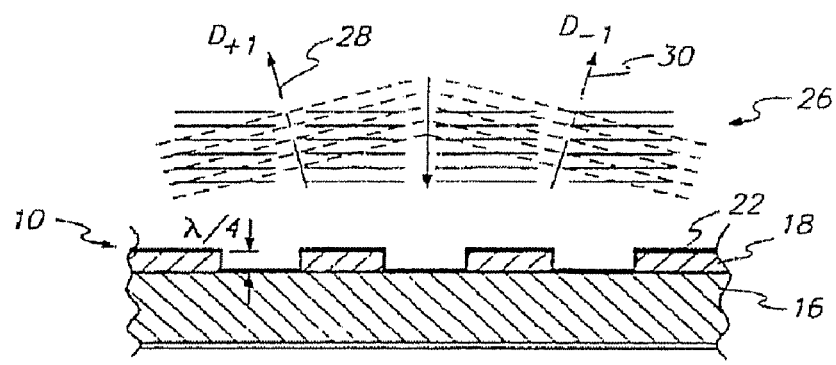
FIG. 3 illustrates diffraction of incident light by the grating light modulator, in a deformed state due to an electrostatic force, according to a conventional technology.

Hereinafter, embodiments of the present invention will be described in detail with reference to the attached drawings.

Reference now should be made to the drawings, in which the same reference numerals are used throughout the different drawings to designate the same or similar components.

FIGS. 4a through 4f are perspective views of hybrid light modulators having elements, according to first through sixth embodiments of the present invention, respectively.

Figure 4A:
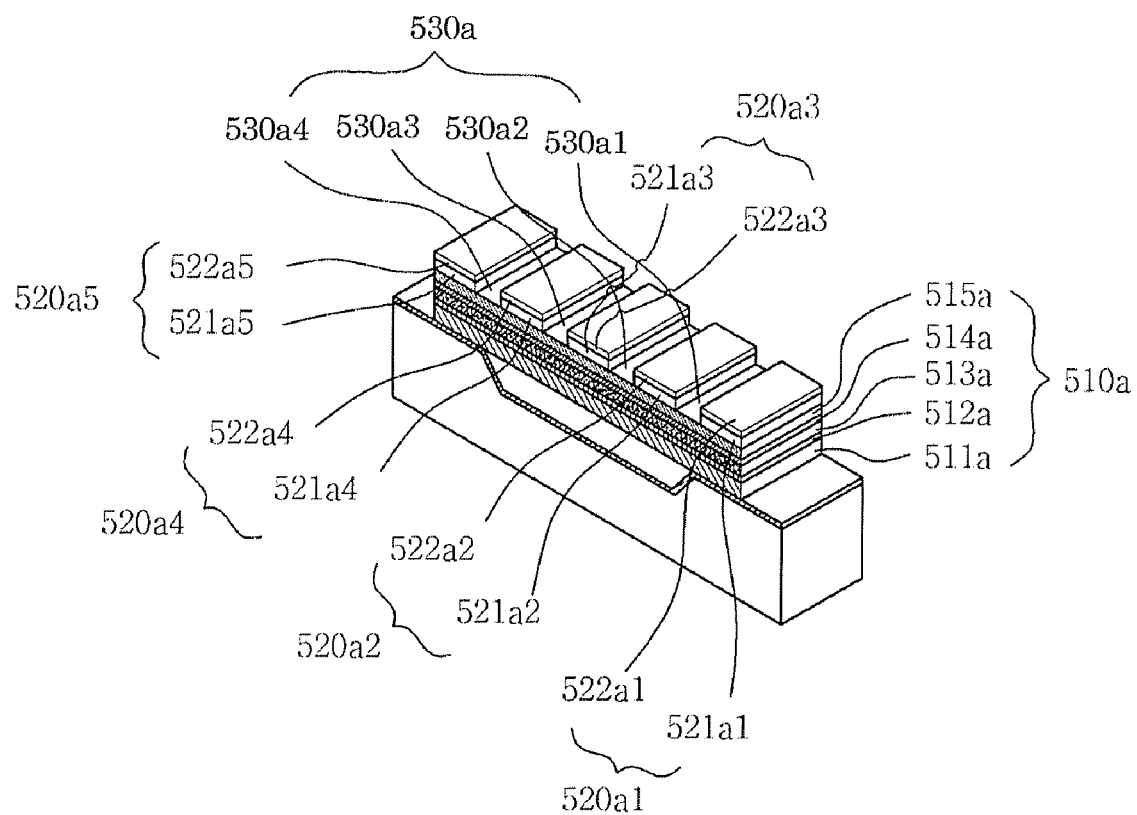
FIGS. 4a through 4f are partial perspective views of hybrid light modulators having elements, according to first through sixth embodiment of the present invention, respectively.

FIG. 4a is a perspective view showing an element 510a of a recess-type hybrid thin-film piezoelectric light modulator, according to a first embodiment of the present invention. Referring to FIG. 4a, the element 510a includes a plurality of protrusions 520a1, 520a2, 520a3, 520a4 and 520a5 which are disposed on a micromirror layer 515a of the element 510a to reflect and diffract incident light. Each of the protrusions 520a1, 520a2, 520a3, 520a4 and 520a5 has a rectangular column shape (ribbon shape). However, the protrusions can be of other shapes, such as square or oval. The protrusions 520a1, 520a2, 520a3, 520a4 and 520a5 are arranged along a longitudinal axis of the element 510a, passing over the recess, to be spaced apart from each other at regular intervals (for example, each interval is the same as the width of the protrusion 520a1, 520a2, 520a3, 520a4, 520a5). Each protrusion 520a1, 520a2, 520a3, 520a4, 520a5 includes a support layer 521a1, 521a2, 521a3, 521a4, 521a5 which is attached at a lower surface thereof to an upper surface of the micromirror layer 515a of the element 510a. Each protrusion 520a1, 520a2, 520a3, 520a4, 520a5 further includes a mirror layer 522a1, 522a2, 522a3, 522a4, 522a5 which is layered on the support layer 521a1, 521a2, 521a3, 521a4, 521a5 to reflect and diffract incident light.

Figure 5A:
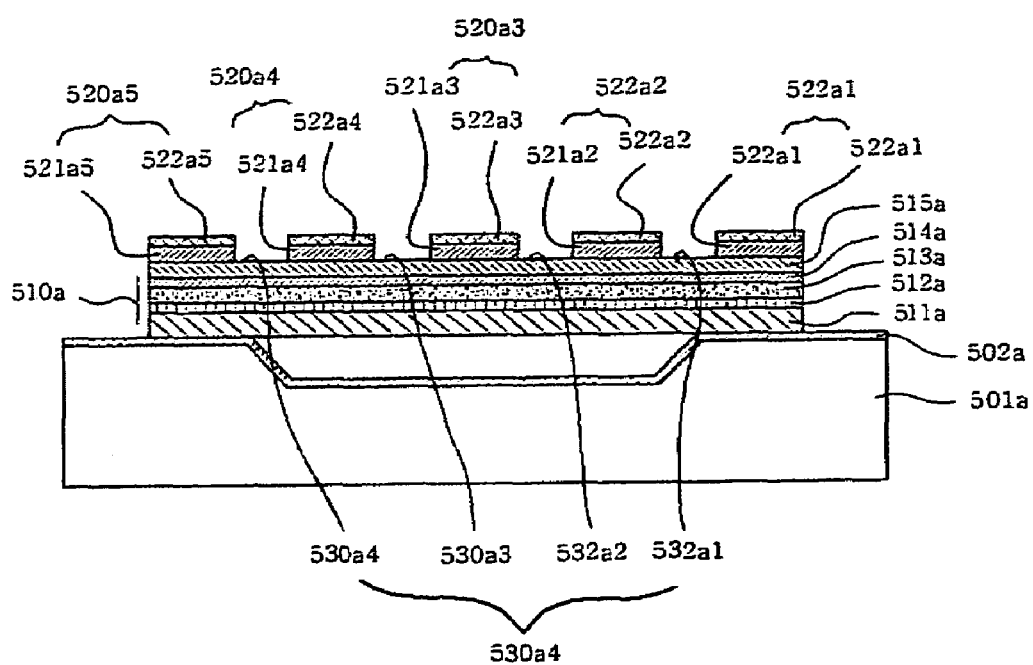
FIGS. 5a through 5f are sectional views of the hybrid light modulators having the elements of FIGS. 4a through 4f, respectively.

At this time, a pixel is formed by both the mirror layer 522a1, 522a2, 522a3, 522a4, 522a5 of one protrusion 520a1, 520a2, 520a3, 520a4, 520a5 and one depression 530a1, 530a2, 530a3, 530a4 of the micromirror layer 515a of the element 510a exposed from the protrusions 520a1, 520a2, 520a3, 520a4 and 520a5. Therefore, in the hybrid light modulator of FIG. 4a, at least one pixel is embodied in a single element 510a, thus realizing miniaturization and high integration of the hybrid light modulator. FIG. 5a is a sectional view taken along the line A-A' of FIG. 4a. With reference to FIG. 5a, the arrangement of the protrusions 520a1, 520a2, 520a3, 520a4 and 520a5 along the longitudinal axis of the element 510a will be distinctly understood.

Furthermore, the hybrid light modulator of the present invention can form a display device having the same number of pixels despite having a reduced number of elements compared with conventional technologies.

For example, in conventional technologies, at least two elements having ribbon shapes are required to form one pixel. In addition, when two elements are used to form one pixel, diffractive efficiency is less than 50%. Therefore, in order to increase diffractive efficiency, in conventional technologies, four, six or eight elements form one pixel. If four or more conventional elements are used to form one pixel, diffractive efficiency becomes higher than 70%. As such, as the number of elements is increased, diffractive efficiency is also increased so as to reach a desired level. However, in the first embodiment of the present invention, four sets of protrusions and depressions (the reference numerals 520a1 and 530a1 defines one set of protrusion and depression, 520a2 and 530a2 defines another set of protrusion and depression, 520a3 and 530a3 defines a further set of protrusion and depression, and 520a4 and 530a4 defines still another set of protrusion and depression) provided on the upper surface of one element 510a can achieve the same diffractive efficiency as when eight elements form one pixel in convention technologies.

In detail, in the first embodiment, the first protrusion 520a1 of the four sets of protrusions and depressions acts like a single element in the conventional technology that reflects incident light. The first depression 530a1 acts like another single element to reflect incident light. The second protrusion 520a2 acts like another single element that reflects incident light. The second depression 530a2 acts like yet another single element to reflect incident light. The third protrusion 520a3 acts like still another single element that reflects incident light. The third depression 530a3 acts like still another single element to reflect incident light. The fourth protrusion 520a4 acts like still another single element that reflects incident light. The fourth depression 530a4 acts like still another single element to reflect incident light. As such, the single element according to the first embodiment having four sets of protrusions and depressions can achieve the same diffractive efficiency as eight elements forming one pixel in the conventional technology.

For example, when a high definition digital television having a 1080×1920 format is embodied using the hybrid light modulator having the above-mentioned structure, 1080 pixels are vertically arranged, and 1920 vertical lines each comprising 1080 pixels are horizontally arranged, thus 1920 light modulating processes are conducted to form a single frame. If 1080 pixels are formed using the conventional technology which forms one pixel using four, six or eight elements, 1080×4 (or 6 or 8) elements are necessary. However, if the element of the present invention having two, three or four sets of protrusions and depressions is used, 1080 pixels are formed by only 1080×1 elements. Therefore, a process of manufacturing products is simplified, thereby productivity is increased. As well, the present invention makes it possible to produce a small device.

In the hybrid light modulator of FIG. 4a, a plurality of elements 510a having regular widths are arranged at regular intervals to constitute the hybrid light modular. Alternatively, the elements 510a having different widths may alternate to constitute the hybrid light modulator. As a further alternative, the elements 510a may be spaced apart from each other at regular intervals (each interval is almost the same as the width of each element 510a), in which a micromirror layer formed on an upper side of a silicon substrate 501a reflects and diffracts incident light.

The silicon substrate 501a has a recess to provide a space to the elements 510a. An insulating layer 502a is deposited or otherwise disposed on an upper surface of the silicon substrate 501a. Both ends of the elements 510a are attached to upper sides of a wall of the recess.

The elements 510a each may have an elongated, thin ribbon shape. However, the elements 510a can be formed in other shapes, such as rectangular, square, oval, etc. Lower sides of the both ends of the elements 510a are attached to or otherwise supported by the remaining upper side of the silicon substrate 501a except for the recess so that the centers of the elements 510a are spaced from the recess of the silicon substrate 501a. The micromirror layer 515a is formed on an upper side of each element 510a. Additionally, each element 510a includes a lower supporter 511a which has a vertically movable portion corresponding in position to the recess of the silicon substrate 501a.

Furthermore, the element 510a includes a lower electrode layer 512a which is laminated or otherwise disposed on the lower supporter 511a to provide a piezoelectric voltage, and a piezoelectric material layer 513a which is laminated or otherwise disposed on the lower electrode layer 512a and shrinks and expands to generate a vertical actuating force when voltage is applied to upper and lower surfaces thereof. The element 510a further includes an upper electrode layer 514a which is laminated or otherwise disposed on the piezoelectric material layer 513a and provides a piezoelectric voltage to the piezoelectric material layer 513a. The element 510a further includes the micromirror layer 515a which is laminated or otherwise disposed on the upper electrode layer 514a to reflect and diffract incident light.

Figure 4B:
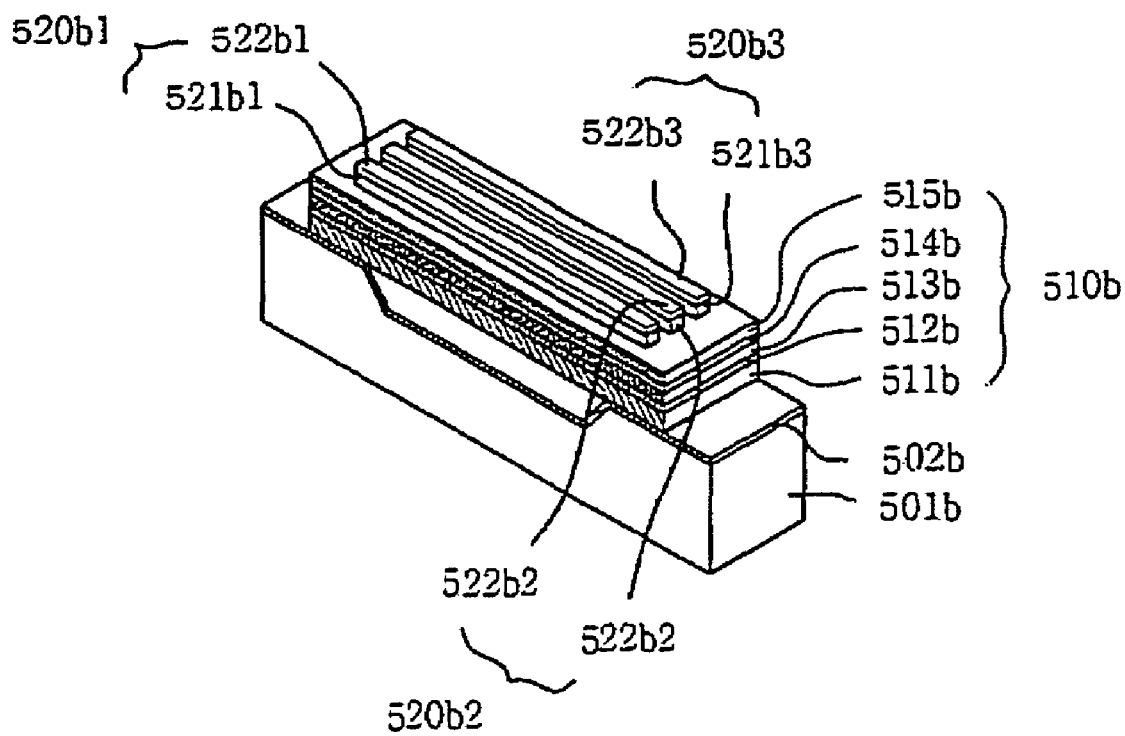

FIG. 4b is a perspective view showing an element 510b of a recess-type hybrid thin-film piezoelectric light modulator, according to a second embodiment of the present invention. Referring to FIG. 4b, the element 510b includes a plurality of protrusions 520b1, 520b2 and 520b3 which is placed on a micromirror layer 515b of the element 510b that reflects and diffracts incident light. Each protrusion 520b1, 520b2, 520b3 has a rectangular column shape (ribbon shape). When the longitudinal axis of the element 510b is defined as the axis passing over the recess, the protrusions 520b1, 520b2 and 520b3 are arranged along a latitudinal axis of the element 510b, unlike the element 510a of FIG. 4a. The protrusions 520b1, 520b2 and 520b3 are spaced apart from each other at regular intervals (for example, each interval is the same as the width of the protrusion 520b1, 520b2, 520b3). Each protrusion 520b1, 520b2, 520b3 includes a support layer 521b1, 521b2, 521b3 which is attached at a lower surface thereof to an upper surface of the micromirror layer 515b of the element 510b. Each protrusion 520b1, 520b2, 520b3 further includes a mirror layer 522b1, 522b2, 522b3 which is layered on the support layer 521b1, 521b2, 521b3 to reflect and diffract incident light.

Figure 5B:
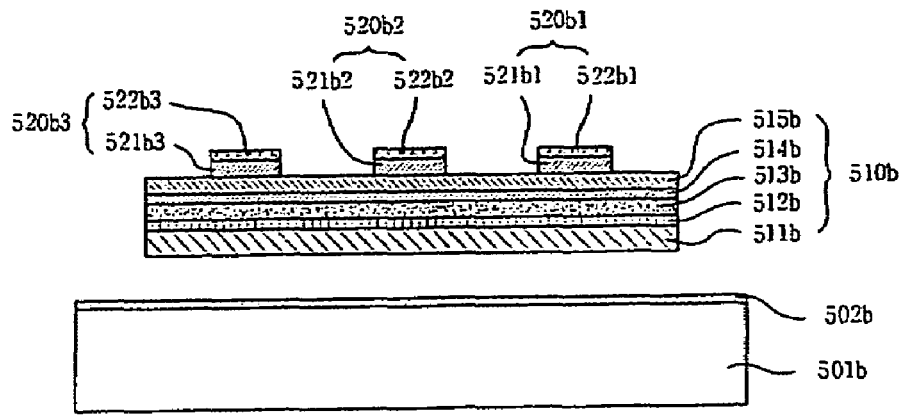

At this time, one pixel is formed by both the mirror layer 522b1, 522b2, 522b3 of one protrusion 520b1, 520b2, 520b3 and one part (one depression) of the micromirror layer 515b of the element 510b exposed from the protrusions 520b1, 520b2 and 520b3. Therefore, in the hybrid light modulator of FIG. 4b, two or more pixels are embodied in a single element 510b, thus realizing miniaturization and high integration of the hybrid light modulator. FIG. 5b is a sectional view taken along the line B-B' of FIG. 4b. With reference to FIG. 5b, the arrangement of the protrusions 520b1, 520b2 and 520b3 along the latitudinal axis of the element 510b will be distinctly understood. Furthermore, the construction of the element 510b of the second embodiment is substantially the same as that of the element 510a of the first embodiment, therefore further explanation is deemed unnecessary.

Figure 4C:
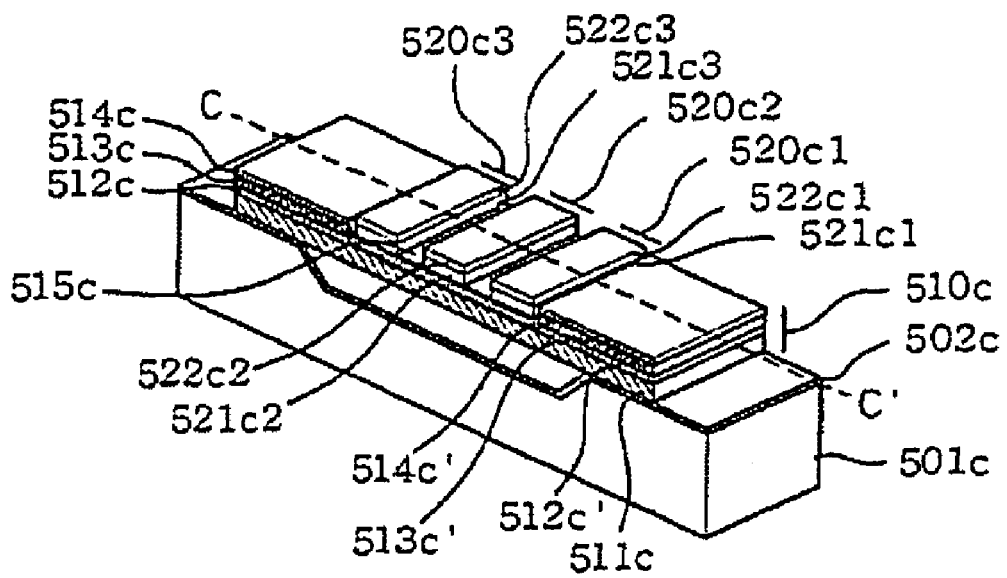

FIG. 4c is a perspective view showing an element 510c of a recess-type hybrid thin-film piezoelectric light modulator, according to a third embodiment of the present invention. Referring to FIG. 4c, the element 510c includes a plurality of protrusions 520c1, 520c2 and 520c3 which is placed on a micromirror layer 515c of the element 510c that reflects and diffracts incident light. Each protrusion 520c1, 520c2, 520c3 has a rectangular column shape (ribbon shape). The protrusions 520c1, 520c2 and 520c3 are arranged along a longitudinal axis of the element 510c, passing over the recess, to be spaced apart from each other at regular intervals (for example, each interval is the same as the width of the protrusion 520c1, 520c2, 520c3). Each protrusion 520c1, 520c2, 520c3 includes a support layer 521c1, 521c2, 521c3 which is attached at a lower surface thereof to an upper surface of the micromirror layer 515c of the element 510c. The protrusion 520c1, 520c2, 520c3 further includes a mirror layer 522c1, 522c2, 522c3 which is layered on the support layer 521c1, 521c2, 521c3 to reflect and diffract incident light.

Figure 5C:
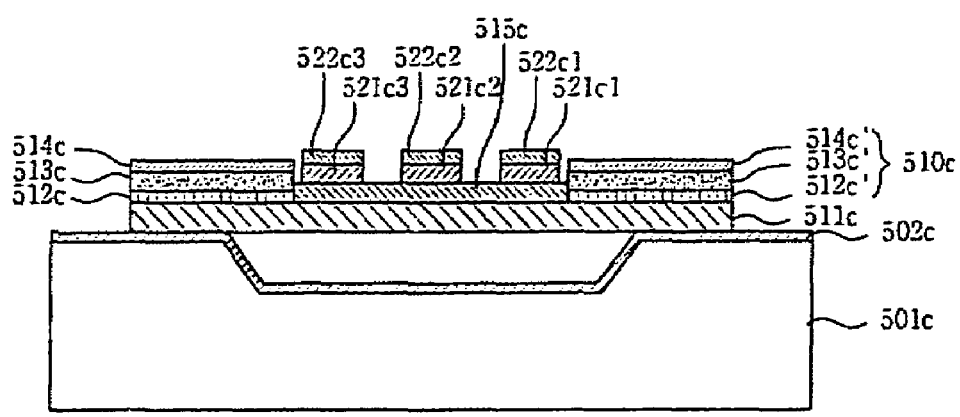

At this time, one pixel is formed by both the mirror layer 522c1, 522c2, 522c3 of one protrusion 520c1, 520c2, 520c3 and one part (one depression) of the micromirror layer 515c of the element 510c exposed from the protrusions 520c1, 520c2 and 520c3. Therefore, in the hybrid light modulator of FIG. 4c, two or more pixels are embodied in a single element 510c, thus realizing miniaturization and high integration of the hybrid light modulator. FIG. 5c is a sectional view taken along the line C-C' of FIG. 4c. With reference to FIG. 5c, the arrangement of the protrusions 520c1, 520c2 and 520c3 along the longitudinal axis of the element 510c will be distinctly understood.

In the hybrid light modulator of FIG. 4c, a plurality of elements 510c having regular widths is arranged at regular intervals to constitute the hybrid light modular. Alternatively, elements 510c having different widths may alternate to constitute the hybrid light modulator. As a further alternative, the elements 510c may be spaced apart from each other at regular intervals (each interval is almost the same as the width of each element 510c), in which a micromirror layer formed on an upper side of a silicon substrate 501c reflects and diffracts incident light.

The silicon substrate 501c has a recess to provide an air space to the elements 510c. An insulating layer 502c is deposited on an upper surface of the silicon substrate 501c. Both ends of the elements 510c are attached to upper sides of a wall of the recess.

The elements 510c each may have a ribbon shape. Lower sides of both ends of the elements 510c are attached to or are otherwise supported by the remaining upper side of the silicon substrate 501c except for the recess so that the centers of the elements 510c are spaced from the recess of the silicon substrate 501c. Additionally, each element 510c includes a lower supporter 511c which has a vertically movable portion (movable toward or away from the recess) corresponding in position to the recess of the silicon substrate 501c.

Furthermore, the element 510c includes a first lower electrode layer 512c which is laminated or otherwise disposed on a first end of the lower supporter 511c to provide a piezoelectric voltage, and a first piezoelectric material layer 513c which is laminated or otherwise disposed on the first lower electrode layer 512c and shrinks and expands to generate a vertical (relative to FIG. 4c) actuating force when a voltage is applied to upper and lower surfaces thereof. The element 510c further includes a first upper electrode layer 514c which is laminated or otherwise disposed on the first piezoelectric material layer 513c and provides a piezoelectric voltage to the first piezoelectric material layer 513c.

In addition, the element 510c includes a second lower electrode layer 512c' which is laminated or otherwise disposed on a second end of the lower supporter 511c to provide a piezoelectric voltage, and a second piezoelectric material layer 513c' which is laminated or otherwise disposed on the second lower electrode layer 512c' and shrinks and expands to generate a vertical (relative to FIG. 4c) actuating force when voltage is applied to upper and lower surfaces thereof. The element 510c further includes a second upper electrode layer 514c' which is laminated or otherwise disposed on the second piezoelectric material layer 513c' and provides a piezoelectric voltage to the second piezoelectric material layer 513c'.

Figure 4D:
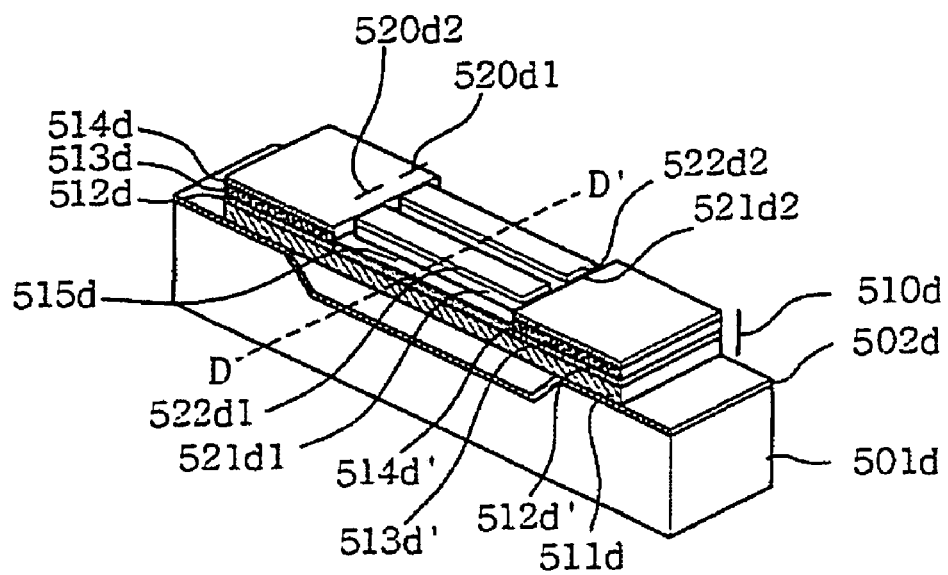

FIG. 4d is a perspective view showing an element 510d of a recess-type hybrid thin-film piezoelectric light modulator, according to a fourth embodiment of the present invention. Referring to FIG. 4d, the element 510d includes a plurality of protrusions 520d1 and 520d2 which is placed on a micromirror layer 515d of the element 510d that reflects and diffracts incident light. Each protrusion 520d1, 520d2 has a rectangular column shape (ribbon shape). When the longitudinal axis of the element 510d is defined as the axis passing over the recess, the protrusions 520d1 and 520d2 are arranged along a latitudinal axis of the element 510d, unlike the element 510c of FIG. 4c. The protrusions 520d1 and 520d2 are spaced apart from each other at regular intervals (for example, each interval is the same as the width of the protrusion 520*d*1, 520*d*2). Each protrusion 520*d*1, 520*d*2 includes a support layer 521*d*1, 521*d*2 which is attached at a lower surface thereof to an upper surface of the micromirror layer 515*d* of the element 510*d*. The protrusion 520*d*1, 520*d*2 further includes a mirror layer 522*d*1, 522*d*2 which is layered on the support layer 521*d*1, 521*d*2 to reflect and diffract incident light.

Figure 5D:
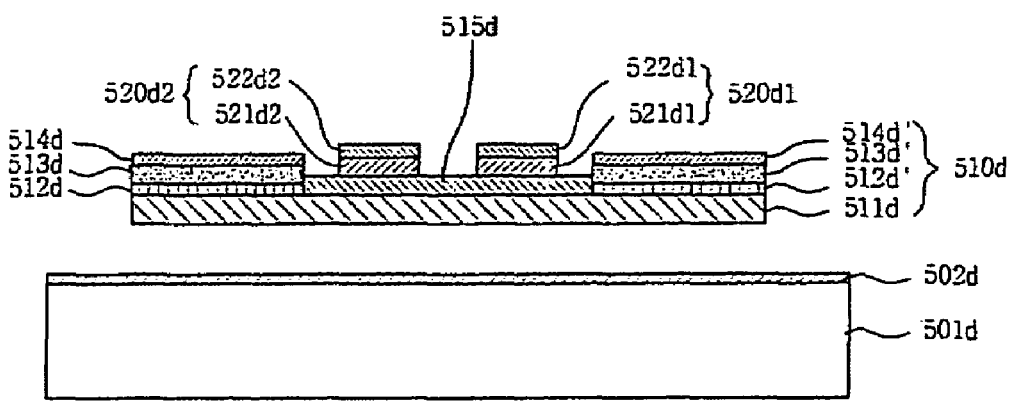

At this time, one pixel is formed by both the mirror layer 522*d*1, 522*d*2 of one protrusion 520*d*1, 520*d*2 and one part (one depression) of the micromirror layer 515*d* of the element 510*d* exposed from the protrusions 520*d*1 and 520*d*2. Therefore, in the hybrid light modulator of FIG. 4*d*, two pixels are embodied in a the single element 510*d*, thus realizing miniaturization and high integration of the hybrid light modulator. FIG. 5*d* is a sectional view taken along the line D-D' of FIG. 4*d*. With reference to FIG. 5*d*, the arrangement of the protrusions 520*d*1 and 520*d*2 along the latitudinal axis of the element 510*d* will be distinctly understood. Furthermore, the construction of the element 510*d* of the fourth embodiment is the same as that of the element 510*c* of the third embodiment, therefore further explanation is deemed unnecessary.

Figure 4E:
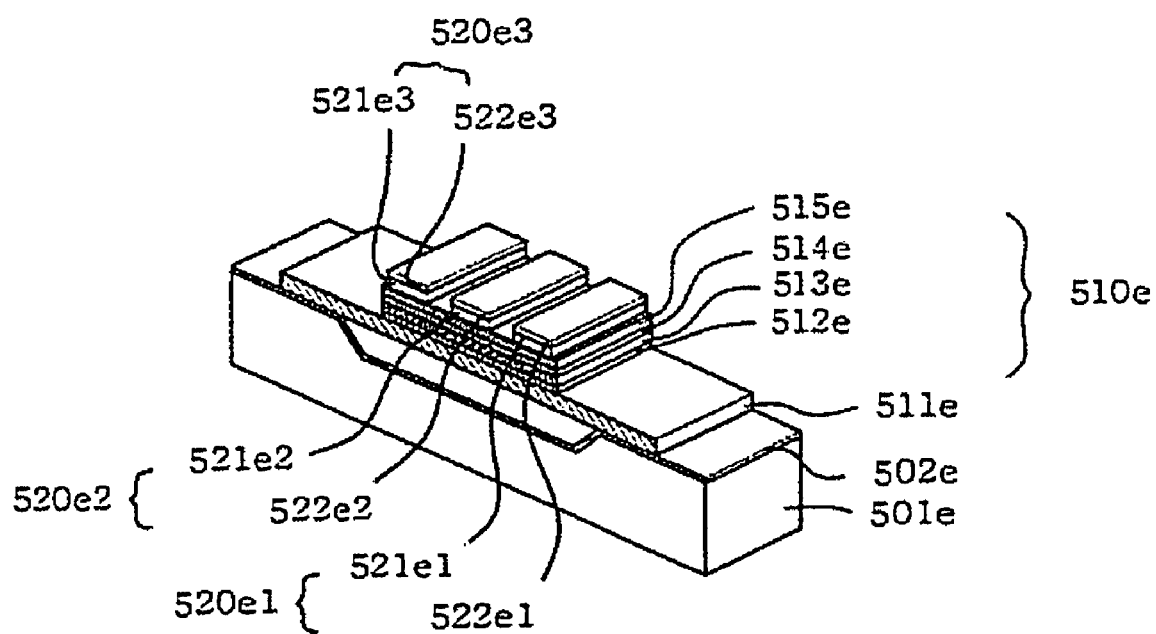

FIG. 4*e* is a perspective view showing an element 510*e* of a recess-type hybrid thin-film piezoelectric light modulator, according to a fifth embodiment of the present invention. Referring to FIG. 4*e*, the element 510*e* includes a plurality of protrusions 520*e*1, 520*e*2 and 520*e*3 which is placed on a micromirror layer 515*e* of the element 510*e* that reflects and diffracts incident light. Each of the protrusions 520*e*1, 520*e*2 and 520*e*3 has a rectangular column shape (ribbon shape). The protrusions 520*e*1, 520*e*2 and 520*e*3 are arranged along a longitudinal axis of the element 510*e*, passing over the recess, to be spaced apart from each other at regular intervals (for example, each interval is the same as the width of the protrusion 520*e*1, 520*e*2, 520*e*3). Each protrusion 520*e*1, 520*e*2, 520*e*3 includes a support layer 521*e*1, 521*e*2, 521*e*3 which is attached at a lower surface thereof to an upper surface of the micromirror layer 515*e* of the element 510*e*. The protrusion 520*e*1, 520*e*2, 520*e*3 further includes a mirror layer 522*e*1, 522*e*2, 522*e*3 which is layered on the support layer 521*e*1, 521*e*2, 521*e*3, respectively, to reflect and diffract incident light.

Figure 5E:
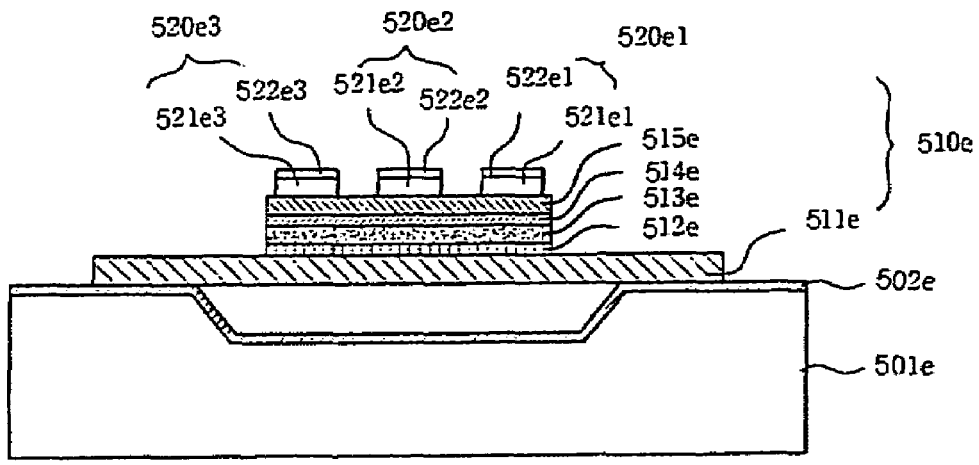

At this time, one pixel is formed by both the mirror layer 522*e*1, 522*e*2, 522*e*3 of one protrusion 520*e*1, 520*e*2, 520*e*3 and one part (one depression) of the micromirror layer 515*e* of the element 510*e* exposed from the protrusions 520*e*1, 520*e*2 and 520*e*3. Therefore, in the hybrid light modulator of FIG. 4*e*, two or more pixels are embodied in a single element 510*e*, thus realizing miniaturization and high integration of the hybrid light modulator. FIG. 5*e* is a sectional view taken along the line E-E' of FIG. 4*e*. With reference to FIG. 5*e*, the arrangement of the protrusions 520*e*1, 520*e*2 and 520*e*3 along the longitudinal axis of the element 510*e* will be understood.

In the hybrid light modulator of FIG. 4*e*, a plurality of elements 510*e* having regular widths are arranged at regular intervals to constitute the hybrid light modulator. Alternatively, the elements 510*e* having different widths may alternate to constitute the hybrid light modulator. As a further alternative, the elements 510*e* may be spaced apart from each other at regular intervals (each interval is almost the same as the width of each element 510*e*), in which a micromirror layer formed on an upper side of a silicon substrate 501*e* reflects and diffracts incident light.

The silicon substrate 501*e* has a recess to provide a space to the elements 510*e*. An insulating layer 502*e* is deposited on an upper surface of the silicon substrate 501*e*. Both ends of the elements 510*e* are attached to upper sides of a wall of the recess.

The elements 510*e* each have a ribbon shape. Lower sides of the both ends of the elements 510*e* are attached to the remaining upper side of the silicon substrate 501*e* except for the recess so that the centers of the elements 510*e* are spaced from the recess of the silicon substrate 501*e*. The micromirror layer 515*e* is formed on an upper side of each element 510*e* above the recess of the silicon substrate 501*e*. That is, portions of the micromirror layer 515*e*, which are aligned with the remaining upper side of the silicon substrate 501*e* other than the recess, are removed by an etching process. Additionally, each element 510*e* includes a lower supporter 511*e* which has a vertically (relative to FIG. 4*e*) movable portion corresponding in position to the recess of the silicon substrate 501*e*.

Furthermore, the element 510*e* includes a lower electrode layer 512*e* which is laminated or otherwise disposed on the lower supporter 511*e* above the recess of the silicon substrate 501*e* to provide a piezoelectric voltage. At this time, portions of the lower electrode layer 512*e*, which are aligned with the remaining upper side of the silicon substrate 501*e* other than the recess, are removed by an etching process. The element 510*e* further includes a piezoelectric material layer 513*e* which is laminated or otherwise disposed on the lower electrode layer 512*e* and shrinks and expands to generate a vertical (relative to FIG. 4*e*) actuating force when voltage is applied to upper and lower surfaces thereof. The element 510*e* further includes an upper electrode layer 514*e* which is laminated or otherwise disposed on the piezoelectric material layer 513*e* and provides a piezoelectric voltage to the piezoelectric material layer 513*e*. The element 510*e* further includes the micromirror layer 515*e* which is laminated or otherwise disposed on the upper electrode layer 514*e* to reflect and diffract incident light.

Figure 4F:
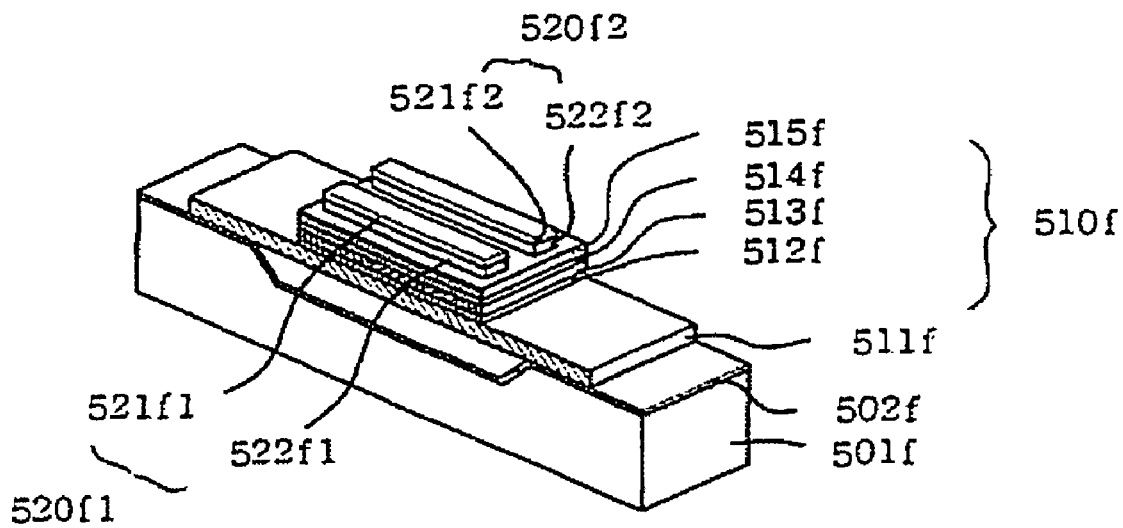

FIG. 4*f* is a perspective view showing an element 510*f* of a recess-type hybrid thin-film piezoelectric light modulator, according to a sixth embodiment of the present invention. Referring to FIG. 4*f*, the element 510*f* includes a plurality of protrusions 520*f*1 and 520*f*2 which is placed on a micromirror layer 515*f* of the element 510*f* that reflects and diffracts incident light. Each protrusion 520*f*1, 520*f*2 has a rectangular column shape (ribbon shape). When it is defined that the longitudinal axis of the element 510*f* is aligned with the direction passing over the recess, the protrusions 520*f*1 and 520*f*2 are arranged along a latitudinal axis of the element 510*f*, unlike the element 510*e* of FIG. 4*e*. The protrusions 520*f*1 and 520*f*2 are spaced apart from each other at regular intervals (for example, each interval is the same as the width of the protrusion 520*f*1, 520*f*2). Each protrusion 520*f*1, 520*f*2 includes a support layer 521*f*1, 521*f*2 which is attached at a lower surface thereof to an upper surface of the micromirror layer 515*f* of the element 510*f*. The protrusion 520*f*1, 520*f*2 further includes a mirror layer 522*f*1, 522*f*2 which is layered on the support layer 521*f*1, 521*f*2 to reflect and diffract incident light.

Figure 5F:
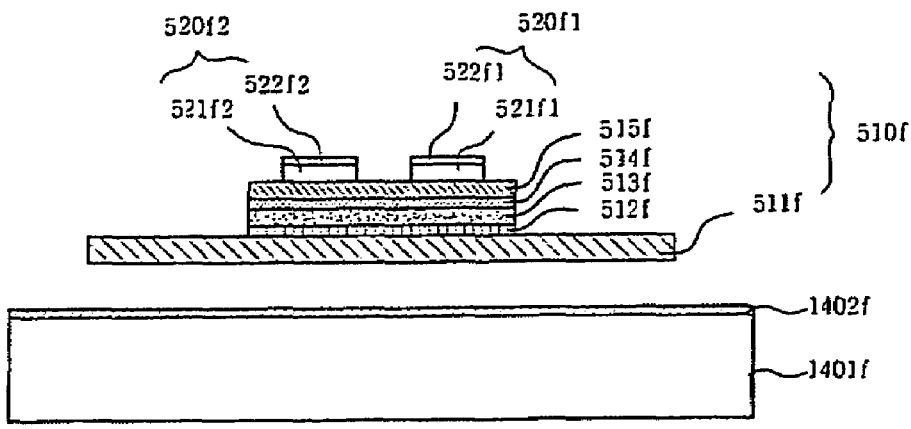

At this time, one pixel is formed by both the mirror layer 522*f*1, 522*f*2 of one protrusion 520*f*1, 520*f*2 and one part of the micromirror layer 515*f* of the element 510*f* exposed from the protrusions 520*f*1 and 520*f*2. Therefore, in the hybrid light modulator of FIG. 4*f*, two pixels are embodied in a single element 510*f*, thus realizing miniaturization and high integration of the hybrid light modulator. FIG. 5*f* is a sectional view taken along the line F-F' of FIG. 4*f*. Reference to FIG. 5*f*, the arrangement of the protrusions 520*f*1 and 520*f*2 along the latitudinal axis of the element 510*f* will be distinctly understood. Furthermore, the construction of the element 510f of the sixth embodiment is the same as that of the element 510e of the fifth embodiment, therefore further explanation is deemed unnecessary.

In the meantime, the elements 510a, 510b, 510c, 510d, 510e, 510f of each of the hybrid light modulators according to the first through sixth embodiments of FIGS. 4a through 4f can be adapted to a protrusion-type diffractive thin-film piezoelectric light modulator disclosed in U.S. patent application Ser. No. 10/952,556, entitled "Diffractive Thin-Film Piezoelectric Light Modulator and a Method of Producing the Same" and incorporated herein by reference.

Figure 6:
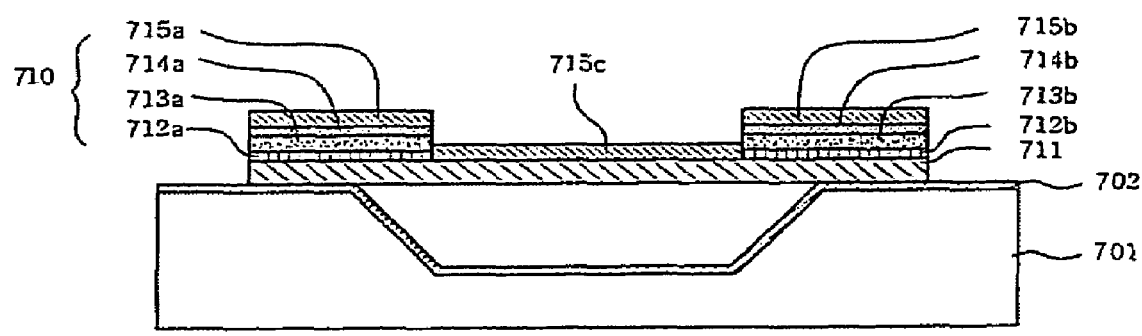
FIG. 6 is a sectional view of a hybrid light modulator, according to a seventh embodiment of the present invention.

FIG. 6 is a sectional view of a hybrid light modulator, according to a seventh embodiment of the present invention. Referring to FIG. 6, an element 710 of the hybrid light modulator according to the seventh embodiment is placed on a silicon substrate 701 while being partially spaced from a bottom of a recess of the silicon substrate 701. The element 710 includes a lower supporter 711 which is attached at both ends thereof (or otherwise supported by) the silicon substrate 701 along upper ends of sidewalls of the recess. The element 710 further includes a first lower electrode layer 712a which is laminated or otherwise disposed on a first end of the lower supporter 711 such that a first end of the first lower electrode layer 712a is aligned with the first end of the lower supporter 711 and a second end of the first lower electrode layer 712a is placed on a predetermined position of the lower supporter 711 spaced to the first side from the center line of the recess. The element 710 further includes a first piezoelectric material layer 713a which is laminated or otherwise disposed on the first lower electrode layer 712a and generates a vertical actuating force when voltage is applied to the first lower electrode layer 713a. The element 710 further includes a first upper electrode layer 714a which is laminated or otherwise disposed on the first piezoelectric material layer 713a and provides a piezoelectric voltage to the first piezoelectric material layer 713a. The element 710 further includes the first micromirror layer 715a which is laminated or otherwise disposed on the first upper electrode layer 714a to reflect and diffract incident light.

The element 710 further includes a third micromirror layer 715c which is laminated or otherwise disposed on an intermediate portion of the lower supporter 711 to reflect and diffract incident light.

The element 710 further includes a second lower electrode layer 712b which is laminated or otherwise disposed on a second end of the lower supporter 711 such that a second end of the second lower electrode layer 712b is aligned with the second end of the lower supporter 711 and a first end of the second lower electrode layer 712b is placed on a predetermined position of the lower supporter 711 spaced to the second side from the center line of the recess. The element 710 further includes a second piezoelectric material layer 713b which is laminated or otherwise disposed on the second lower electrode layer 712b and generates a vertical actuating force when a voltage is applied to the second lower electrode layer 713b. The element 710 further includes a second upper electrode layer 714b which is laminated or otherwise disposed on the second piezoelectric material layer 713b and provides a piezoelectric voltage to the second piezoelectric material layer 713b. The element 710 further includes the second micromirror layer 715b which is laminated or otherwise disposed on the second upper electrode layer 714b to reflect and diffract incident light.

In the hybrid light modulator of FIG. 6, one pixel is formed by both the first micromirror layer 715a and a part of the third micromirror layer 715c which is placed to the first side based on the line A-A' of FIG. 6. The other pixel is formed by both the second micromirror layer 715b and a part of the third micromirror layer 715c which is placed to the second side based on the line A-A' of FIG. 6. As a result, two pixels are embodied in a single element 710.

Figure 7:
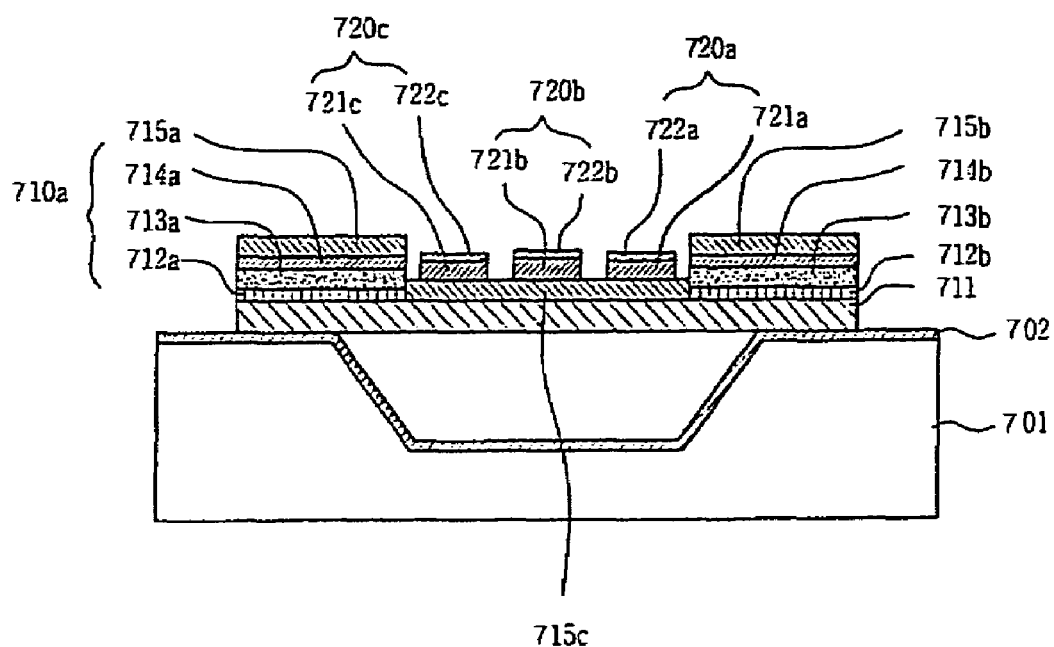
FIG. 7 is a sectional view of a hybrid light modulator, according to an eighth embodiment of the present invention.

FIG. 7 is a sectional view of a hybrid light modulator, according to an eighth embodiment of the present invention. Referring to FIG. 7, in the hybrid light modulator according to the eighth embodiment, a plurality of protrusions 720a, 720b and 720c are provided on a third micromirror layer 715c of an element 710 which has essentially the same structure as that of the element 710 of the seventh embodiment. At this time, the protrusions 720a, 720b and 720c are arranged along a latitudinal axis of the element 710. The element 710 of the eight embodiment includes first and second micromirror layers 715a and 715b which are laminated or otherwise disposed on first and second upper electrode layers 714a and 714b, respectively, unlike the element 510c of the third embodiment shown in FIG. 4c.

Each protrusion 720a, 720b, 720c includes a support layer 721a, 721b, 721c which is attached or otherwise supported on a lower surface thereof to an upper surface of the third micromirror layer 715c, and a mirror layer 722a, 722b, 722c which is layered on the support layer 721a, 721b, 721c.

In the hybrid light modulator of FIG. 7, one pixel is formed by both the first micromirror layer 715a and a part of the third micromirror layer 715c which is exposed between the first micromirror layer 715a and the first protrusion 720a.

Another pixel is formed by both the first protrusion 720a and a part of the third micromirror layer 715c which is exposed between the first protrusion 720a and the second protrusion 720b. In the same manner as above, a plurality of pixels can be embodied in a single element 710. The general construction of the element 710 of the eighth embodiment, aside from the above-mentioned structure, remains the same as the seventh embodiment, therefore further explanation is deemed unnecessary.

Figure 8:
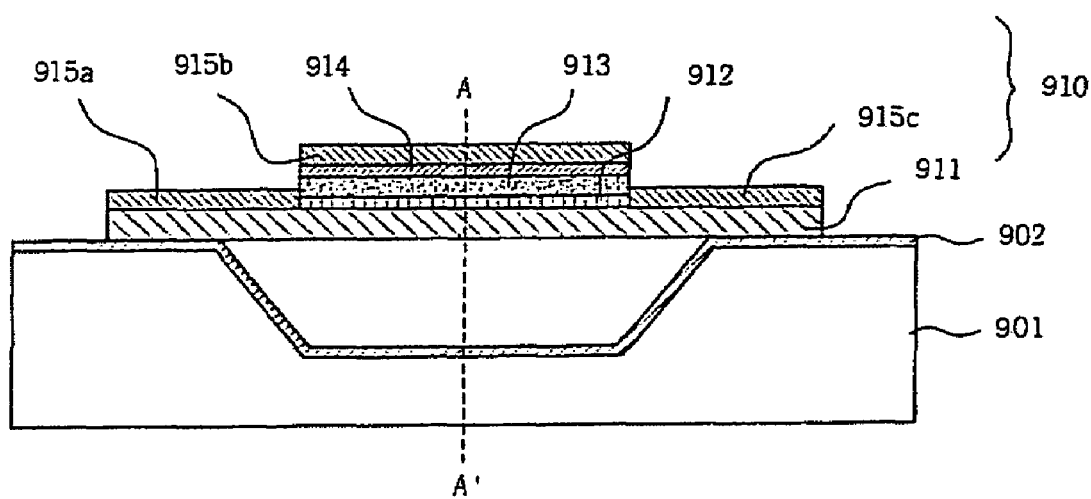
FIG. 8 is a sectional view of a hybrid light modulator, according to a ninth embodiment of the present invention.

FIG. 8 is a sectional view of a hybrid light modulator, according to a ninth embodiment of the present invention.

Referring to FIG. 8, an element 910 of the hybrid light modulator according to the ninth embodiment includes first and third micromirror layers 915a and 915c which are provided on both ends of a lower supporter 911, unlike the element 510e of the fifth embodiment shown in FIG. 4e. In the hybrid light modulator of FIG. 8, one pixel is formed by both the first micromirror layer 915a and a part of the second micromirror layer 915b which is on one side of line A-A' of FIG. 8. The other one pixel is formed by both the third micromirror layer 715c and a part of the second micromirror layer 715b which is on the other side of the line A-A' of FIG. 8. The general construction of the element 910 of the ninth embodiment, aside from the above-mentioned structure, remains the same as the fifth embodiment of FIG. 4e, therefore further explanation is deemed unnecessary.

Figure 9A:
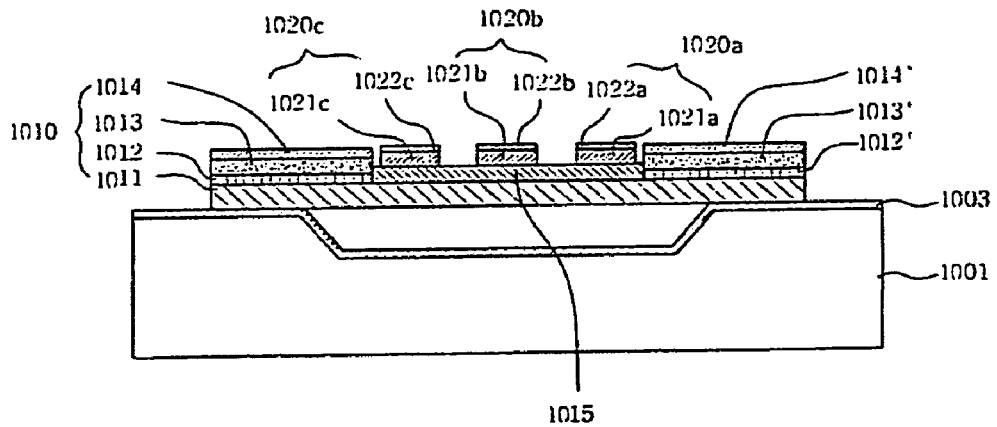
FIGS. 9a through 9c are views showing operation of the hybrid light modulator, according to the present invention.
Figure 9B:
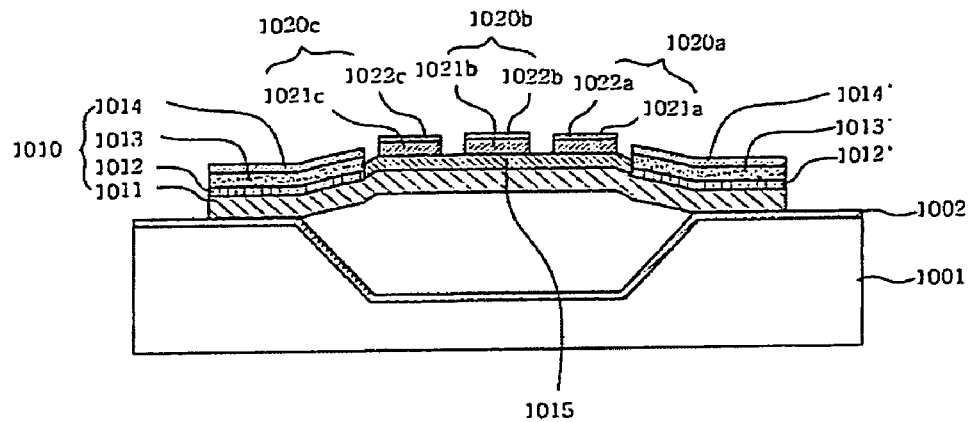
Figure 9C:
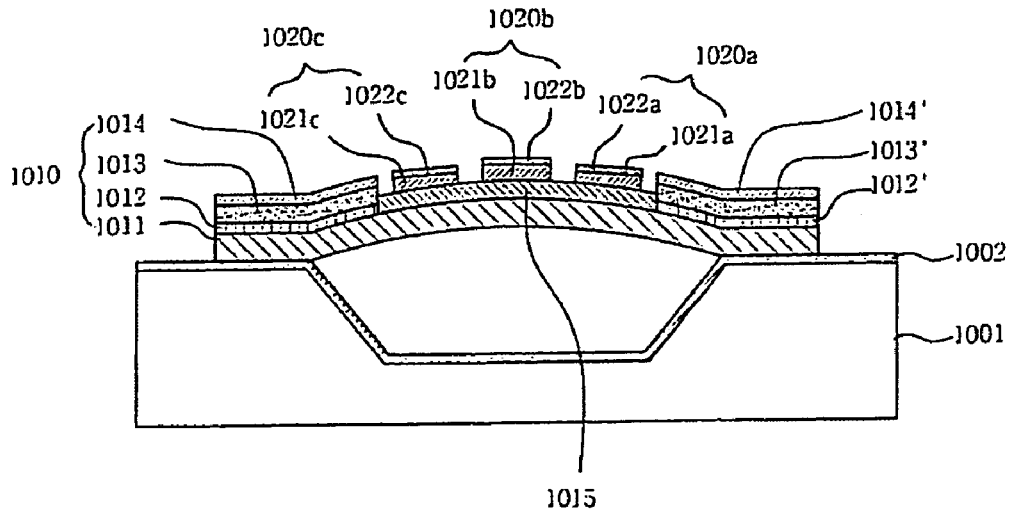

FIGS. 9a through 9c are views showing operation of the hybrid light modulator, according to the present invention.

Referring to FIG. 9a, the hybrid light modulator includes a plurality of protrusions 1020a, 1020b and 1020c. As shown in FIG. 9b, if a lower supporter 1011 is rigid, the protrusions 1020a, 1020b and 1020c vertically, in relation to FIG. 9a, move without being stepped.

However, as shown in FIG. 9c, if the lower supporter 1011 is flexible, the protrusions 1020a, 1020b and 1020c vertically move while forming a stepped structure. As a result, the direction of diffracted light is changed.

Typically, in conventional technologies, the amount of diffracted light is changed, while the diffractive angle of light determined by a grating (ribbon) width is fixed. However, in the present invention, the diffractive angle of light can also be changed. When such a hybrid light modulator of the present invention is used in a display device, the ON/OFF state of the modulator can be controlled by the principle by which light is passed through a fixed slit or not by changing the diffractive angle of the light.

Furthermore, according to a degree of the rigidity of the lower supporter 1011, the direction of diffracted light may be maintained or changed. Therefore, the hybrid light modulator of the present invention can diffract incident lights in a wide direction.

Meanwhile, in the preferred embodiments of the present invention, piezoelectric force is used to provide a vertical actuating force to the element of the hybrid light modulator. However, electrostatic or electromagnetic force may be used as a vertical actuating force for the hybrid light modulator.

In the case in which electrostatic force is used as a vertical actuating force for the hybrid light modulator, one layer of an element is embodied as a first electrode layer. A second electrode layer is provided over or below the element (in the case of the second electrode layer provided below the element, it is preferred that the second electrode layer be placed in a recess of the element). Thus, when a voltage is applied to the first and second electrode layers, the element is moved upwards and downwards by electrostatic force, thus being convex or concave. When a voltage is cut off, the element is returned to the initial horizontal state by a restoring force.

In the case in which electromagnetic force is used as a vertical actuating force, a first electromagnetic force generating unit is provided on a element. A second electromagnetic force generating unit is provided over or below the element, so that the element is moved upwards and downwards by attraction and repulsion between the first and second electromagnetic force generating units.

In the meantime, in the preferred embodiments using piezoelectric force, the actuating unit having a single piezoelectric material layer has been explained. However, multiple piezoelectric material layers may be used. In detail, the actuating unit may have a structure in which a first piezoelectric material layer is placed on a lower electrode layer, and an intermediate electrode layer is laminated on the first piezoelectric material layer, and, consecutively, a second piezoelectric material layer is placed on the intermediate electrode layer, and an upper electrode layer is laminated on the second piezoelectric material layer.

As described above, the present invention provides a hybrid light modulator which realizes miniaturization of products, thus reducing production costs.

For example, in the conventional technology, at least two elements having ribbon shapes are required to form one pixel. In addition, when two elements are used to form one pixel, diffractive efficiency is less than 50%. Therefore, in order to increase diffractive efficiency, in conventional technologies, four or six elements are used to form one pixel. If four or more conventional elements form one pixel, diffractive efficiency becomes higher than 70%. As such, as the number of elements is increased, diffractive efficiency is also increased so as to reach a desired level. However, in the present invention, three sets of protrusions and depressions provided on the upper surface of one element can achieve the same diffractive efficiency as when six conventional elements form one pixel.

Therefore, in a high definition digital television having a 1080×1920 format embodied by the hybrid light modulator of the present invention, 1080 pixels are vertically arranged, and 1920 vertical lines each comprising 1080 pixels are horizontally arranged, thus 1920 light modulating processes are conducted to form a single frame. If 1080 pixels are formed using the conventional technology which forms one pixel using four or six elements, 1080×4 (or 6) elements are necessary. However, if the element of the present invention having two or three sets of protrusions and depressions is used, 1080 pixels are formed by only 1080×1 elements. Therefore, a process of manufacturing products is simplified, thereby the productivity is increased. As well, the present invention makes it possible to produce a small device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A hybrid light modulator, comprising:
   (a) a substrate;
   (b) a light modulating unit mounted on the substrate, comprising:
      an elongate ribbon structure supported on the substrate, said elongate ribbon structure defining an intermediate portion spaced apart from the substrate;
      a plurality of protrusions disposed on the elongate ribbon structure and extending in a direction away from the substrate, said protrusions spaced apart from each other;
      at least one depression adjacent each protrusion; and
      wherein the protrusions and the adjacent depressions each having a seperate reflective surface to reflect incident light, so that diffractive light is formed by light reflected by a protrusion and by light reflected by a depression adjacent said protrusion; and
   (c) an actuating unit to move the intermediate portion of the light modulating unit spaced apart from the substrate towards or away from the substrate thereby also moving the plurality of protrusions and the plurality of adjacent depressions toward or away from the substrate, so that an angle of the light defined by the plurality of protrusions and the plurality of adjacent depressions varies.

2. The hybrid light modulator according to claim 1, wherein the substrate has a recess thereon to provide a space relative to the light modulating unit, and the light modulating unit is spaced apart at the intermediate portion of the elongate ribbon structure from the bottom of the recess of the substrate to move toward or away from the bottom of the recess.

3. The hybrid light modulator according to claim 1, wherein:
   the actuating unit comprises:
      a first electrode layer made of a conductive material, the first electrode layer mounted on the substrate so that portions of the first electrode layer are spaced from the substrate;
      a piezoelectric material layer disposed on the first electrode layer; and
      a second electrode layer disposed on the piezoelectric material layer opposite the first electrode layer;
   the light modulating unit is mounted on the second electrode layer; and when voltage is applied to the first electrode layer and the second electrode layer, the piezoelectric material layer longitudinally expands to generate actuating force to move the light modulating unit towards or away from the substrate so that an angle of diffracted light varies.

4. The hybrid light modulator according to claim 1:

further comprising a support structure mounted on the substrate so that intermediate portions of the support structure are spaced apart from the substrate, the support structure being movable toward or away from the substrate;

wherein the light modulating unit is disposed on the support structure at a location where the support structure is spaced apart from the substrate; and the actuating unit comprises a piezoelectric material layer disposed on the support structure at a position generating an actuating force on the light modulating unit toward or away from the substrate when a voltage is applied to the piezoelectric material layer.

5. The hybrid light modulator according to claim 4, further comprising a mirror layer disposed on the piezoelectric material layer to reflect incident light.

6. The hybrid light modulator according to claim 1, wherein the actuating unit comprises:

a first electrode layer provided on the light modulating unit; and a second electrode layer spaced from the first electrode layer, so that, when voltage is applied to the first and second electrode layers, the first electrode layer is moved toward or away from the second electrode layer by an electrostatic force, thus moving the light modulating unit toward or away from the substrate, thereby an angle of diffracted light varies.

7. The hybrid light modulator according to claim 1, wherein the actuating unit comprises:

a first electromagnetic force generating unit provided on the light modulating unit; and a second electromagnetic force generating unit spaced from the first electromagnetic force generating unit, so that the light modulating unit is moved toward or away from the substrate by electromagnetic force, which is generated by an applied voltage, thereby varying an angle of diffracted light.

8. The hybrid light modulator according to claim 1, wherein the protrusions and depressions are alternately arranged on the light modulating unit.

9. The hybrid light modulator according to claim 1, wherein said light modulating unit flexing under the influence of the actuating unit thereby to move towards or away from the substrate.

10. The hybrid light modulator according to claim 1, wherein the light modulating unit is elongate and flexible in a direction lateral to its length.

11. The hybrid light modulator according to claim 1, wherein as the light modulating unit moves towards or away from the substrate, the angles of the diffractive surfaces of the protrusions and depressions are changed thereby to change the angle of the diffractive light.

12. A hybrid light modulator, comprising:

(a) a substrate;

(b) a light modulating unit mounted on the substrate, comprising:

an intermediate portion spaced apart from the substrate;

at least one protrusion extending in a direction away from the substrate;

at least one depression adjacent each protrusion; and wherein the protrusions and the depressions each having a reflective surface to reflect incident light, so that diffractive light is formed by light reflected by the protrusion and by light reflected by the depression;

(c) an actuating unit to move the intermediate portion of the light modulating unit spaced apart from the substrate towards or away from the substrate, so that an angle of the diffracted light varies;

(d) wherein said elongate structure further comprising a support structure supported by the substrate so that intermediate portions of the support structure are spaced apart from the substrate, the support structure being movable towards or away from the substrate;

(e) wherein the actuating unit comprises:

a first electrode layer made of conductive material and mounted on the support structure;

a piezoelectric material layer disposed on the first electrode layer; and a second electrode layer disposed on the piezoelectric material layer;

(f) wherein the light modulating unit is mounted on the second electrode layer; and (g) wherein when voltage is applied to the first electrode layer and the second electrode layer, the piezoelectric material layer longitudinally expands to generate an actuating force toward or away from the substrate, thus moving the light modulating unit toward or away from the substrate so that an angle of diffracted light varies.

* * * * *